United States Patent
Routier

(10) Patent No.: US 8,794,926 B2
(45) Date of Patent: Aug. 5, 2014

(54) TURBINE BLADE WITH IMPROVED AERODYNAMIC PERFORMANCE

(75) Inventor: Pascal Routier, Le Mee sur Siene (FR)

(73) Assignee: Snecma, Paris (FR)

( * ) Notice: Subject to any disclaimer, the term of this patent is extended or adjusted under 35 U.S.C. 154(b) by 479 days.

(21) Appl. No.: 13/123,922

(22) PCT Filed: Oct. 6, 2009

(86) PCT No.: PCT/FR2009/051897
§ 371 (c)(1),
(2), (4) Date: Apr. 13, 2011

(87) PCT Pub. No.: WO2010/043798
PCT Pub. Date: Apr. 22, 2010

(65) Prior Publication Data
US 2011/0200442 A1    Aug. 18, 2011

(30) Foreign Application Priority Data

Oct. 13, 2008  (FR) ...................................... 08 56903

(51) Int. Cl.
*F01D 5/14* (2006.01)
(52) U.S. Cl.
USPC ...................................... 416/228; 416/236 R
(58) Field of Classification Search
USPC .................... 416/228, 235, 236 R, 236 A, 237
See application file for complete search history.

(56) References Cited

U.S. PATENT DOCUMENTS

| 2,150,299 | A | * | 3/1939 | Telfer ......................... 416/236 R |
| 2,800,291 | A |   | 7/1957 | Stephens |
| 3,578,264 | A |   | 5/1971 | Kuethe |
| 3,588,005 | A |   | 6/1971 | Rethorst |
| 4,830,315 | A |   | 5/1989 | Presz et al. |
| 6,416,289 | B1 | * | 7/2002 | Ramesh et al. ............... 416/235 |
| 2002/0079405 | A1 |   | 6/2002 | Layukallo |

FOREIGN PATENT DOCUMENTS

DE    845 900    8/1952
JP    2-1962 B2    1/1990

OTHER PUBLICATIONS

International Search Report issued Mar. 4, 2010 in PCT/FR09/051897 filed Oct. 6, 2009.
Office Action issued May 24, 2013, in Chinese Patent Application No. 200980140739.x (English-language translation only).
Office Action issued Feb. 21, 2014, in Chinese Patent Application No. 200980140739.x (with English-language translation).
Office Action issued Jul. 2, 2013 in Japanese Patent Application No. 2011-530526 submitting English translation only.

* cited by examiner

*Primary Examiner* — Dwayne J White
(74) *Attorney, Agent, or Firm* — Oblon, Spivak, McClelland, Maier & Neustadt, L.L.P.

(57) ABSTRACT

One or more protuberances are provided on a turbine blade on its suction side in a vicinity of its trailing edge. The protuberances serve to reduce a separation zone in a vicinity of a blade surface that is responsible for disturbances that affect efficiency of the turbine.

17 Claims, 2 Drawing Sheets

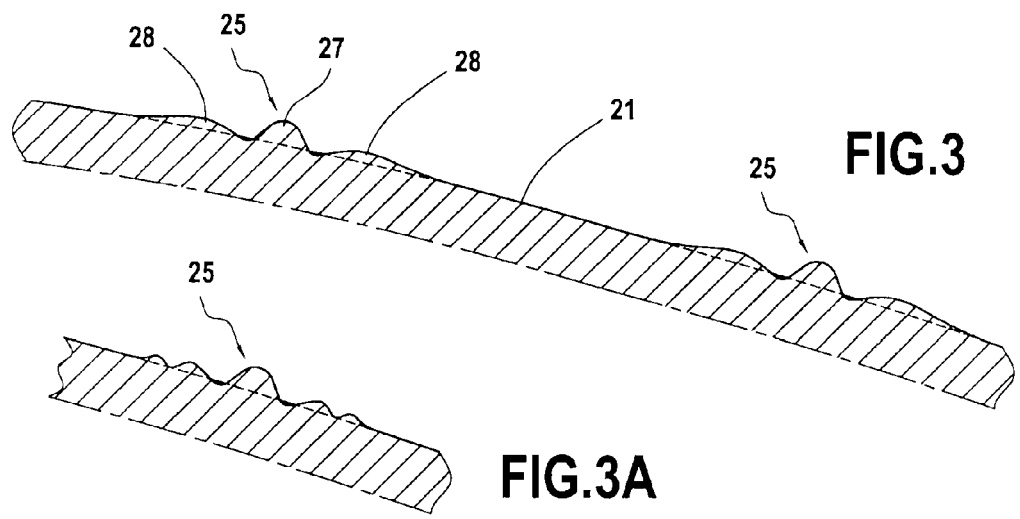
FIG.3
FIG.3A
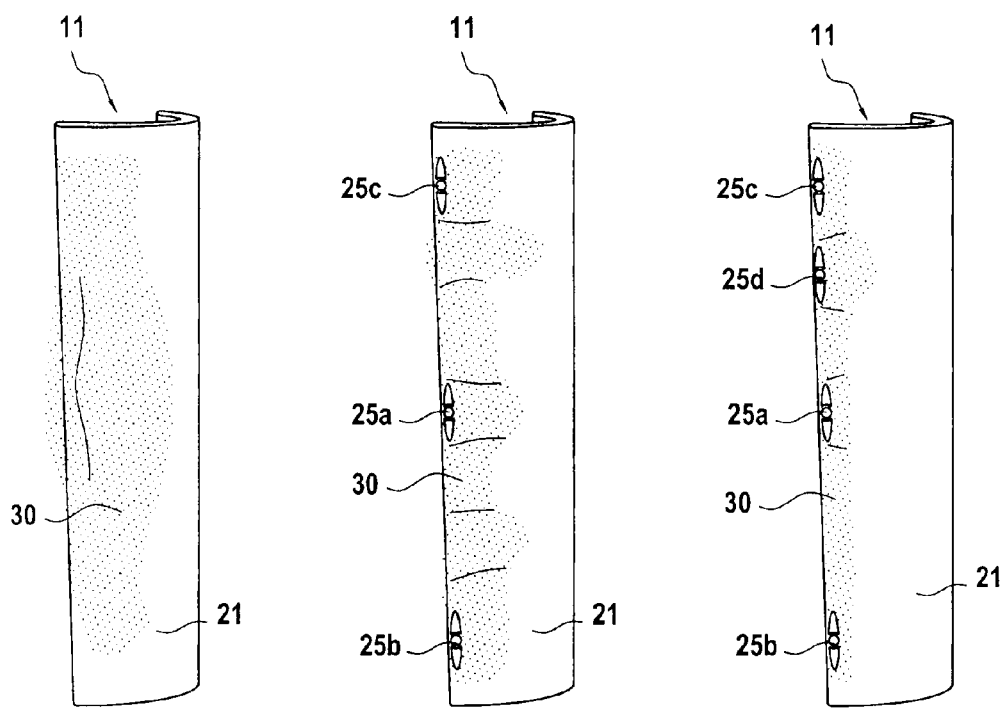
FIG.4

TURBINE BLADE WITH IMPROVED AERODYNAMIC PERFORMANCE

BACKGROUND OF THE INVENTION

1. Field of the Invention

The invention relates to a turbine blade, in particular a blade for a moving wheel of a low pressure turbine for an airplane turbojet, with the aerodynamic behavior of the blade being improved so as to avoid the boundary layer of the air stream separating from the surface of the blade, mainly at its rear in the region of its suction side.

2. Description of the Related Art

In the design of novel turbine blade shapes, in particular for the moving blades fitted to a wheel of a given turbine stage, it is desirable to increase performance by modifying certain structural parameters. In particular, in order to reduce the weight of the turbine, one possible solution consists in reducing the number of blades, thereby requiring the blade profiles to be re-drawn so as to comply with the outlet angles and so as to compensate as much as possible for the loss of efficiency.

By proceeding in this way, it is possible to find that there is a harmful risk of the air flow "separating" from the suction side. Such turbulent disturbances begin in the vicinity of certain zones of the suction side of the blade and they are very damaging to performance. The invention serves to attenuate those separation phenomena.

BRIEF SUMMARY OF THE INVENTION

More particularly, the invention provides a turbine blade, characterized in that it includes at least one protuberance in the vicinity of its trailing edge on its suction side.

In order to determine the location of such a protuberance along the trailing edge, the starting point is a representation of the separation zone on the suction side (which representation may be obtained by calculation), and then it is decided to place such a protuberance in the vicinity of the maximum disturbance zone as determined without using such a protuberance.

By proceeding in this way, it generally happens that at least one above-mentioned protuberance is placed substantially halfway up the trailing edge. Other protuberances may advantageously be placed in the vicinity of the inner radial end of said trailing edge and/or in the vicinity of the radial outer end of said trailing edge.

As a general rule, the calculations lead to placing a plurality of the above-mentioned protuberances so that they are distributed along the outer radial third of said trailing edge.

The shape of such a protuberance is preferably generally that of a rounded stud projecting from the suction side surface and connecting smoothly therewith.

Preferably, a middle section of the protuberance, taken perpendicularly to the trailing edge, is in the form of a half-wave that connects smoothly with the suction side surface.

In an embodiment, another section of said protuberance, taken perpendicularly to said middle section, has the shape of an undulation presenting a central extremum with damped side waves. In other words, as seen in this section, said protuberance is similar in shape to the wave that is caused in the plane surface of a liquid by a falling drop of liquid, this wave shape nevertheless not being circumferentially isomorphic around the central point.

BRIEF DESCRIPTION OF THE SEVERAL VIEWS OF THE DRAWINGS

The invention can be better understood and other advantages thereof appear more clearly in the light of the following description given purely by way of example and made with reference to the accompanying drawings, in which:

FIG. 3 is a fragmentary section in another plane showing the profile of said protuberance;

FIG. 3A is a view analogous to FIG. 3 showing a variant; and

FIG. 4 is a diagrammatic view showing a step in the method of determining the number and the locations of the protuberances along the trailing edge.

DETAILED DESCRIPTION OF THE INVENTION

Figure 1:
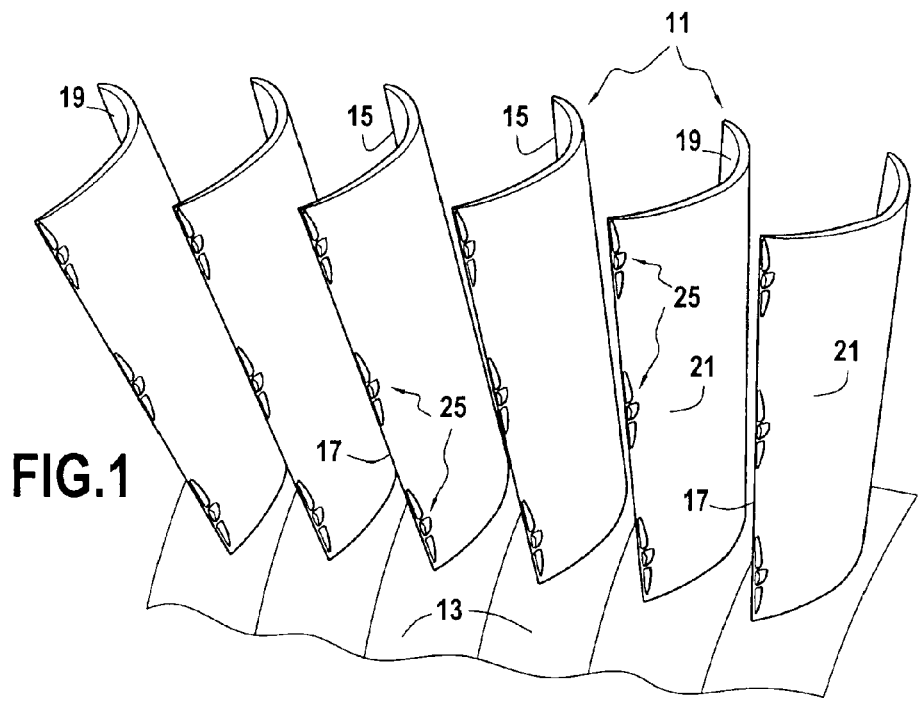
FIG. 1 is a fragmentary perspective view of a turbine rotor wheel provided with blades in accordance with the invention.

FIG. 1 shows a plurality of rotor blades 11, specifically the moving blades extending generally radially from the periphery of a rotor disk 13. Conventionally, each blade, presenting a certain amount of thickness that varies from front to back, is curved between a leading edge 15 and a trailing edge 17. The concave portion or pressure side 19 is smooth. The convex portion or suction side 21 is smooth over the major fraction of its surface with the exception of a few protuberances 25 in accordance with the invention that are distributed in the vicinity of and along the trailing edge 17. In general, such a protuberance 25 is preferably generally in the shape of a rounded stud projecting from the suction side surface 21 and smoothly connecting therewith.

Figure 2:
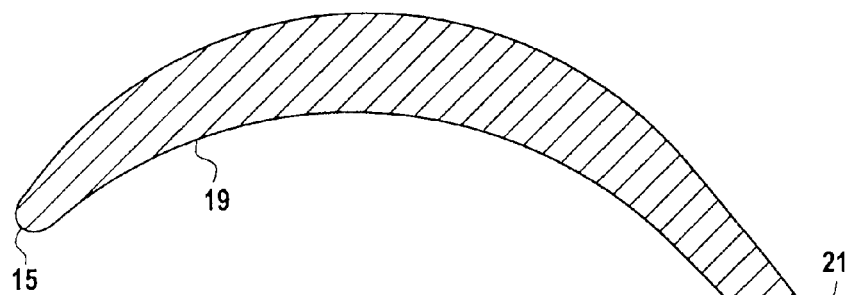
FIG. 2 is a fragmentary section of a blade, showing the profile of a protuberance in accordance with the invention.
Figure 2:
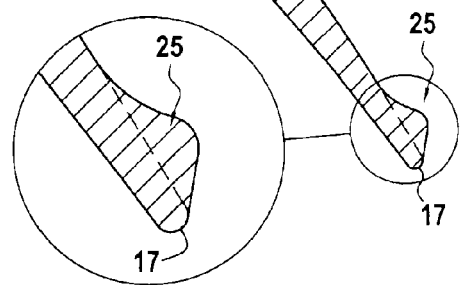

Preferably, the profile of the section of the protuberance, perpendicularly to the suction side surface where it is located, varies between the shapes shown in FIGS. 2 and 3.

Thus, as shown in FIG. 2, a middle section through said protuberance 25 taken perpendicularly to the trailing edge 17 presents the shape of a simple half-wave that connects smoothly with the surface of the suction side 21. It should be observed that the slope of this half-wave is shallower towards the front and steeper towards the rear. In this section, the protuberance connects to the trailing edge with continuity.

In contrast, if consideration is given to another section of the same protuberance that is perpendicular to the preceding section, i.e. parallel to the trailing edge, as shown in FIG. 3, then it can be seen that the protuberance presents a shape that is more complex, namely one or more undulations presenting a central extremum 27 and damped side waves 28. In the variant of FIG. 3A, it can be seen that the section of the protuberance 25 comprises a plurality of damped undulations on either side of the extremum. As mentioned above, this section is comparable to the wave that is generated on a calm liquid surface by a falling drop of liquid. On "turning" about the protuberance, the section varies in continuous manner from one of those sections to the other over one-fourth of a turn.

With the preferred shape for the protuberance being as defined above, there follows a description of the locations for such protuberances and the way in which these locations are determined.

FIG. 4 is a diagram showing from left to right the various stages in positioning the protuberances on a blade 11 shown looking at the surface of its suction side 21. The grayed portion represents the "separation" zone 30 on the suction side in the vicinity of the trailing edge.

It can be seen that without any protuberance, this separation zone 30 extends over practically the entire height of the blade from the trailing edge, with a maximum width substantially halfway up. An analysis of this shape leads to placing a first protuberance 25a in the vicinity of the zone of maximum disturbance, i.e. halfway up the blade, close to the trailing edge. The result of this first simulation (not shown) reveals a reduction in the area of the disturbance at half-height, but also reveals persistent disturbances at the inner and outer radial ends. This leads to placing another protuberance 25b in the vicinity of the inner radial end of the trailing edge and/or in the vicinity of the outer radial end 25c of the trailing edge. Thus, by way of example, when three protuberances are put into place, as shown, this also corresponding to the embodiment that can be seen in FIG. 1, then the width of the zone of disturbances or separation zone is reduced over practically the entire radial height of the blade, while nevertheless maintaining a persistent pronounced disturbance zone between the central protuberance and the outer protuberance.

It is found that in application of the method developed in the context of the invention, placing a fourth protuberance 25d along the outer radial third of the trailing edge between the central protuberance 25a and the outer protuberance 25c serves to reduce this last separation zone.

The invention claimed is:

1. A turbine rotor blade, comprising:
   a pressure side and a suction side,
   wherein a majority of a surface of the suction side is smooth, except for at least one protuberance which is only provided at and along a trailing edge of the turbine rotor blade on the suction side, and
   wherein the pressure side is smooth.

2. A turbine rotor blade according to claim 1, wherein a location of the at least one protuberance along the trailing edge is selected to be in a vicinity of a maximum separation zone as calculated without the protuberance.

3. A turbine rotor blade according to claim 1, wherein the at least one protuberance is situated substantially at half-height along the trailing edge.

4. A turbine rotor blade according to claim 1, including a plurality of the at least one protuberance, distributed along the trailing edge.

5. A turbine rotor blade according to claim 1, wherein the at least one protuberance is in a vicinity of an inner radial end of the trailing edge.

6. A turbine rotor blade according to claim 1, wherein the at least one protuberance is in a vicinity of an outer radial end of the trailing edge.

7. A turbine rotor blade according to claim 1, including a plurality of the at least one protuberance distributed along a radial outer third of the trailing edge.

8. A turbine rotor blade according to claim 1, wherein a middle section of the at least one protuberance perpendicular to the trailing edge is in a shape of a half-wave that connects smoothly with the suction side surface.

9. A turbine rotor blade according to claim 8, wherein a slope of the half-wave is shallower towards its front and steeper towards its rear.

10. A turbine rotor blade according to claim 8, wherein a section of the at least one protuberance perpendicular to the middle section is in a form of an undulation presenting a central extremum and damped side waves.

11. A turbine rotor blade according to claim 9, wherein a section of the at least one protuberance perpendicular to the middle section is in a form of an undulation presenting a central extremum and damped side waves.

12. A turbine rotor blade according to claim 1, constituting a moving blade.

13. A turbine wheel, fitted with blades, each according to claim 1.

14. A turbine rotor blade having a pressure side surface and a suction side surface, the turbine rotor blade comprising:
   at least one protuberance in a vicinity of a trailing edge of the turbine rotor blade on its suction side,
   wherein the shape of the at least one protuberance is substantially a rounded stud projecting from the suction side surface and connecting smoothly therewith, the pressure side surface being smooth.

15. A turbine wheel, fitted with blades, each according to claim 14.

16. A turbine rotor blade having a pressure side surface and a suction side surface, the turbine rotor blade comprising:
   at least one protuberance in the vicinity of a trailing edge of the turbine rotor blade on its suction side,
   wherein a middle section of the at least one protuberance perpendicular to the trailing edge is in a shape of a half-wave that connects smoothly with the suction side surface, a slope of the half-wave being shallower towards its front and steeper towards its rear, and the pressure side surface being smooth.

17. A turbine wheel, fitted with blades, each according to claim 16.

* * * * *